United States Patent [19]
Gehman et al.

[11] Patent Number: 6,002,878
[45] Date of Patent: Dec. 14, 1999

[54] PROCESSOR POWER CONSUMPTION ESTIMATOR THAT USING INSTRUCTION AND ACTION FORMULAS WHICH HAVING AVERAGE STATIC AND DYNAMIC POWER COEFFICIENTS

[75] Inventors: John B. Gehman, Trophy Club, Tex.; Kerry Lucille Johns-Vano, Scottsdale; Colleen Kane Steward, Mesa, both of Ariz.

[73] Assignee: Motorola, Inc., Schaumburg, Ill.

[21] Appl. No.: 08/886,505

[22] Filed: Jul. 1, 1997

[51] Int. Cl.$^6$ .................................................. G01R 19/00
[52] U.S. Cl. ................... 395/750.08; 702/483; 702/488; 702/578
[58] Field of Search ..................... 395/750.01–750.08; 364/483, 488, 578; 324/76.11

[56] References Cited

U.S. PATENT DOCUMENTS

| | | | |
|---|---|---|---|
| 5,383,137 | 1/1995 | Burch | 364/578 |
| 5,557,557 | 9/1996 | Frantz et al. | 364/578 |
| 5,602,753 | 2/1997 | Fukui | 364/489 |
| 5,692,160 | 11/1997 | Sarin | 395/500 |
| 5,754,435 | 5/1998 | Sato | 702/60 |
| 5,768,130 | 6/1998 | Lai | 364/489 |
| 5,790,874 | 8/1998 | Tanaka et al. | 395/750.03 |

*Primary Examiner*—Thomas C. Lee
*Assistant Examiner*—Harold Kim
*Attorney, Agent, or Firm*—Gregory Gorrie

[57] ABSTRACT

A process (20) is presented for determining the total routine energy (78) consumed by a processor (22) during the execution of a code routine (36). This total routine energy (78) is computed by determining the operation energy (76) consumed in the execution of each operating instruction (38) within the code routine (36). The operation energy (76) for each operating instruction (38) is computed by determining the average operation power (74) consumed during the execution of the operating instruction (38). The average operation power (74) for each operating instruction (38) is determined by determining an instruction power (90) and a summed-action power (92) for that operating instruction (38). The summed-action power (92) is the sum of action powers (96) computed through the use of an action formula (100) for each internal action (88) performed by the processor (22) in response to the operating instruction (38).

14 Claims, 8 Drawing Sheets

| CODE | VALUE OF VARIABLE |
|---|---|
| 0 | 1 |
| 1 | INPUT HAMMING DISTANCE |
| 2 | OUTPUT HAMMING DISTANCE |
| 3 | NUMBER OF CLOCK CYCLES BETWEEN INTERRUPTS |
| 4 | SUM OF INPUT AND OUTPUT HAMMING DISTANCES |

FORMULAS

| INSTRUCTION POWER | $P_1 = f_c \left( C_1 X^{E_0} + C_0 \right)$ | ~94 |
|---|---|---|
| ACTION POWER | $P_A = f_c \left( C_2 Y^{E_1} + \dfrac{C_3}{Z} \right) + C_4$ | ~100 |
| SUMMED ACTION POWER | $P_S = P_{A_1} + P_{A_2} + \cdots + P_{A_N}$ | ~98 |
| AVERAGE OPERATION POWER | $P_O = P_1 + P_S$ | ~84 |
| OPERATION ENERGY | $E_O = \dfrac{P_O K_O}{f_c}$ | ~172 |
| TOTAL ROUTINE ENERGY | $E_T = E_{O_1} + E_{O_2} + \cdots + E_{O_N}$ | ~180 |

*FIG. 4A*

| TERM | DESCRIPTION | UNITS | |
|---|---|---|---|
| RESULTS: | | | |
| $P_I$ | INSTRUCTION POWER | WATTS | ~90 |
| $P_A$ | ACTION POWER | WATTS | ~96 |
| $P_S$ | SUMMED ACTION POWER | WATTS | ~92 |
| $P_O$ | AVERAGE OPERATION POWER | WATTS | ~74 |
| $E_O$ | OPERATION ENERGY | WATT-SEC'S | ~76 |
| $E_T$ | TOTAL ROUTINE ENERGY | WATT-SEC'S | ~78 |
| COEFFICIENTS: | | | |
| $f_C$ | CLOCK FREQUENCY | CYCLES/SEC | ~106 |
| $K_O$ | OPERATION CLOCK CYCLES | CYCLES | ~126 |
| $X$ | INSTRUCTION VARIABLE | | ~108 |
| $C_0, C_1$ | INSTRUCTION CONSTANTS | | ~110 |
| $E_0$ | INSTRUCTION EXPONENT | | ~111 |
| $Y, Z$ | ACTION VARIABLES | | ~112 |
| $C_2, C_3, C_4$ | ACTION CONSTANTS | | ~114 |
| $E_1$ | ACTION EXPONENT | | ~115 |

*FIG. 4B*

PROCESSOR POWER CONSUMPTION ESTIMATOR THAT USING INSTRUCTION AND ACTION FORMULAS WHICH HAVING AVERAGE STATIC AND DYNAMIC POWER COEFFICIENTS

FIELD OF THE INVENTION

The current invention relates to processor power estimation. More specifically, the current invention relates to the estimation of processor power consumption for specific instruction code sequences.

BACKGROUND OF THE INVENTION

In the design of battery-powered processor-based systems for specific applications, e.g. cellular telephones, test instruments, etc., the current trend is for increased performance, operating frequency, and integration density while decreasing power consumption. These goals are often mutually exclusive, necessitating a design compromise. A proper design compromise requires an analysis of all pertinent factors, including processor energy consumption.

One of the most critical factors in system design is battery life. Batteries are traditionally rated in current over time, e.g. ampere-hours. Since batteries have a nominally fixed voltage, battery usage is directly related to energy (power over time) usage, e.g. volt-ampere-hours or watt-hours. The amount of energy consumed by the system, therefore, has a direct bearing upon battery life.

Processor energy consumption is of concern to the designer. Traditional methods of optimizing processor energy consumption utilize best-guess and rule-of-thumb techniques for processor selection. In this approach, a designer selects a processor based upon spec-sheet data and personal experience. The designer then designs, prototypes, and programs the system, before actually measuring the resultant energy consumption.

The traditional approach has several inherent problems, one of which is that spec-sheet data for a given processor rarely provides adequate energy consumption data upon which to base an objective processor selection. This data lack may be partially compensated for by the designer's personal experience with the processor or family of processors in question, but at the cost of selection objectivity. Even with the best and most experienced designers, however, the vagaries of design often result in power consumptions of more than double the design estimates.

Another problem deals directly with the designer's personal experience. Once a designer has gained sufficient experience to successfully predict performance for a given processor or family of processors, the tendency arises to view all designs from that perspective. That is, the designer may unconsciously become processor biased, and begin to think in terms of "what is the best way to use processor XYZ for this task," rather than "what is the best processor for this task."

Yet another problem may arise in that the energy consumption of a processor is traditionally measured after the system has been prototyped and programmed. By this point in the design cycle, considerable resources have been expended in system development. A designer would, naturally, be reluctant to scrap the prototype and start again even if testing were to reveal that a different processor may have been a better choice. As a result, a system may be made to suffer with a less than optimal processor and with a greater than necessary power consumption.

Again, a problem inherent in traditional techniques is that of code optimization. As is well known to system programmers, there are many ways of encoding virtually any function. What is often unappreciated is that different methods of encoding may consume different amounts of energy in a given processor. Traditionally, code is optimized for speed or for size, energy rarely being considered. Unfortunately, code that consumes the least energy may be neither the fastest code nor the most compact code.

The energy consumed by a processor for a given instruction or series of instructions is dynamic. That is, the energy consumption depends heavily upon the input and output data being processed. This means that this energy consumption cannot be accurately tabulated on an instruction by instruction basis independent of the data being processed.

What is desired is a technique for estimating processor energy consumption well in advance of prototyping. By so doing, an objective processor selection may be made. The desired estimating technique should be flexible enough to allow for processor reselection, should that be indicated, without the expenditure of significant design resources.

At the same time, the desired estimating technique should be accurate enough so that the actual processor energy consumption is significantly equal to the design estimate, e.g. within a few per cent.

Likewise, the desired estimating technique should evaluate processor energy consumption for a given instruction or series of instructions dynamically. That is, is should be able to take into account input and output conditions for those instructions in a simulated real-world environment.

In the course of determining overall system energy consumption, the desired estimating technique should also determine the worst-case processor power consumption. As worst-case processor power consumption requires maximal battery current, it may be utilized to select the appropriate system battery and in determining circuit layout.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIGS. 4A and 4B depicts tables of power and energy estimation formulas and associated results and coefficients in accordance with a preferred embodiment of the present invention;

DETAILED DESCRIPTION OF THE DRAWINGS

Throughout this discussion it should be born in mind that the term "power" refers to the rate of consumption of electrical energy. Power may be instantaneous (the rate of energy consumption at an instant in time) or average (the rate of energy consumption over a period of time). Power may be expressed in "watts" (w), without a time factor. The term "energy," on the other hand, refers to the actual electrical energy being consumed. Time is a factor in energy, which may be expressed in "watt-seconds" (w-s).

Figure 1:
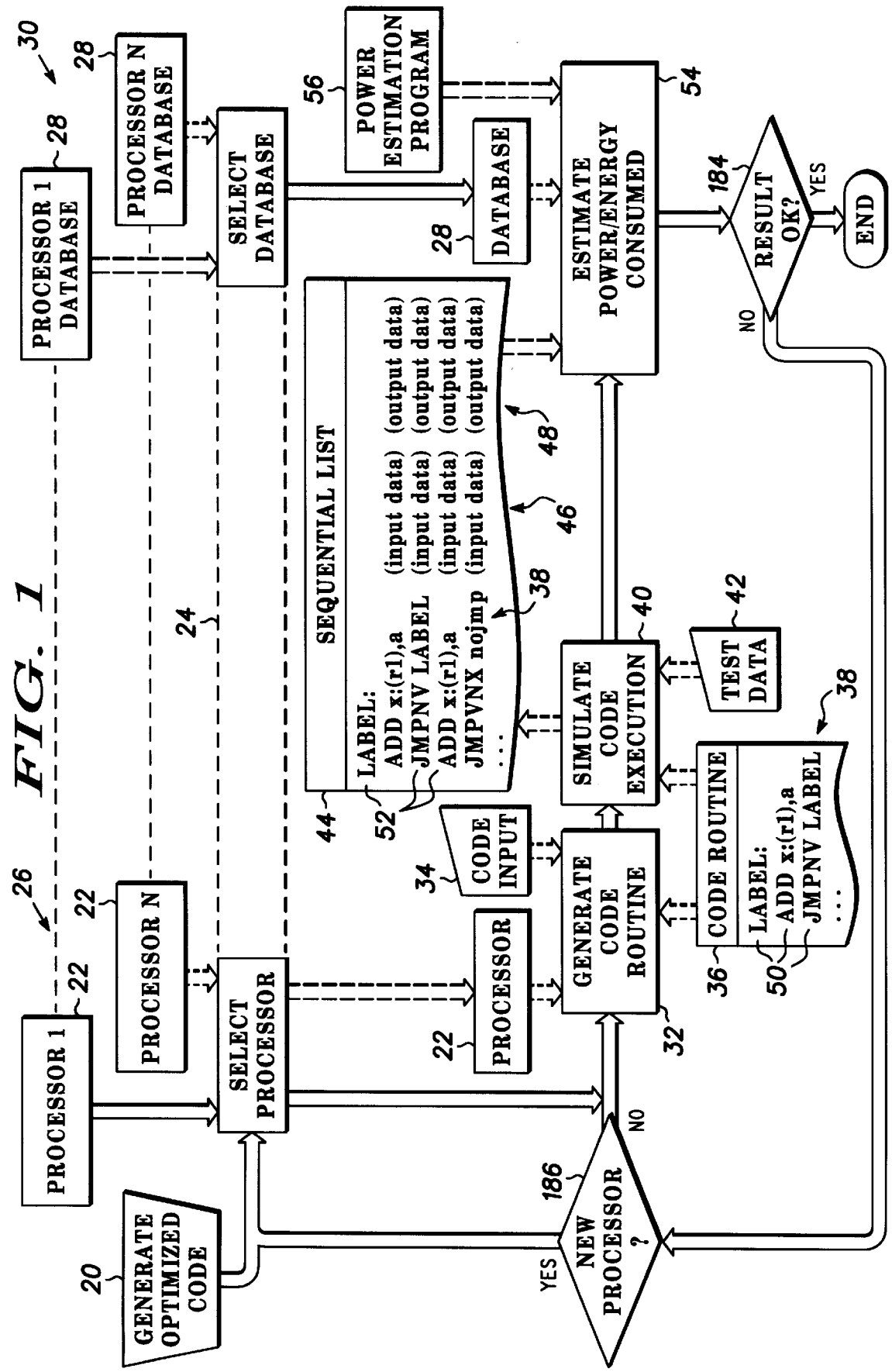
FIG. 1 depicts a flowchart of a process for the generation of power-optimized code routines for a processor in accordance with a preferred embodiment of the present invention.

FIG. 1 depicts a flowchart of a process 20 for the generation of power-optimized code routines for a processor 22 in accordance with a preferred embodiment of the present invention. Process 20 provides an effective and accurate predetermination of processor energy consumption for a battery-operated device under development.

Process 20 contains a selection task 24 in which a particular processor 22 is selected from among a library 26 of processors 22. Each processor 22 in library 26 correlates to a database 28 (discussed later) in a library 30 of databases 28. When selection task 24 selects specific processor 22 from library 26 it also selects a corresponding database 28 from library 30. The outputs of task 24 are the selected processor 22 and database 28. The early implementation of task 24 within the design cycle gives the designer the freedom to investigate processors 22 outside his or her personal experience, leading to a more optimal selection for the device under development, i.e. the device in which processor 22 will be used.

After task 24, a code generation task 32 is performed wherein code 34 for processor 22 is input to produce a code routine 36. Code routine 36 represents a real code routine to be used within the device under development. In the preferred embodiment, code routine 36 is a series of assembly-language operating instructions 38 for processor 22.

Following task 32, a simulation task 40 simulates the execution of code routine 36. This is accomplished by inputting code routine 36 generated in task 32 into a conventional processor simulator (not shown), along with test data 42 exemplifying real-world conditions within the device under development. By producing simulated real-world results, task 40 allows a system programmer to produce code optimized for energy consumption, thus achieving a minimal overall energy consumption for the device under development. Minimizing energy consumption maximizes battery life. The output of task 40 is a sequential listing 44 of operating instructions 38 for processor 22, coupled with input test data 46 and output test data 48 for each operating instruction 38, as is conventional from simulators.

Sequential listing 44 differs from code routine 36 in that each operating instruction 38 is listed as it is executed during program flow. In the examples shown in FIG. 1, code routine 36 has a code segment 50 containing a loop. In sequential listing 44, sequential code segment 52 has been expanded and the loop straightened out. That is, all instructions involved are shown sequentially, in the order they are executed. For loops, the instructions therein are shown the number of times they are executed, i.e. the number of iterations performed by the loop. The code in code routine 36 is shown sequentially in sequential listing 44, without regard to actual code address in memory. Additionally, since sequential listing 44 is the result of simulation task 40, the input data 46 and output data 48 for each operating instruction 38 are also included.

Figures 2, 8:
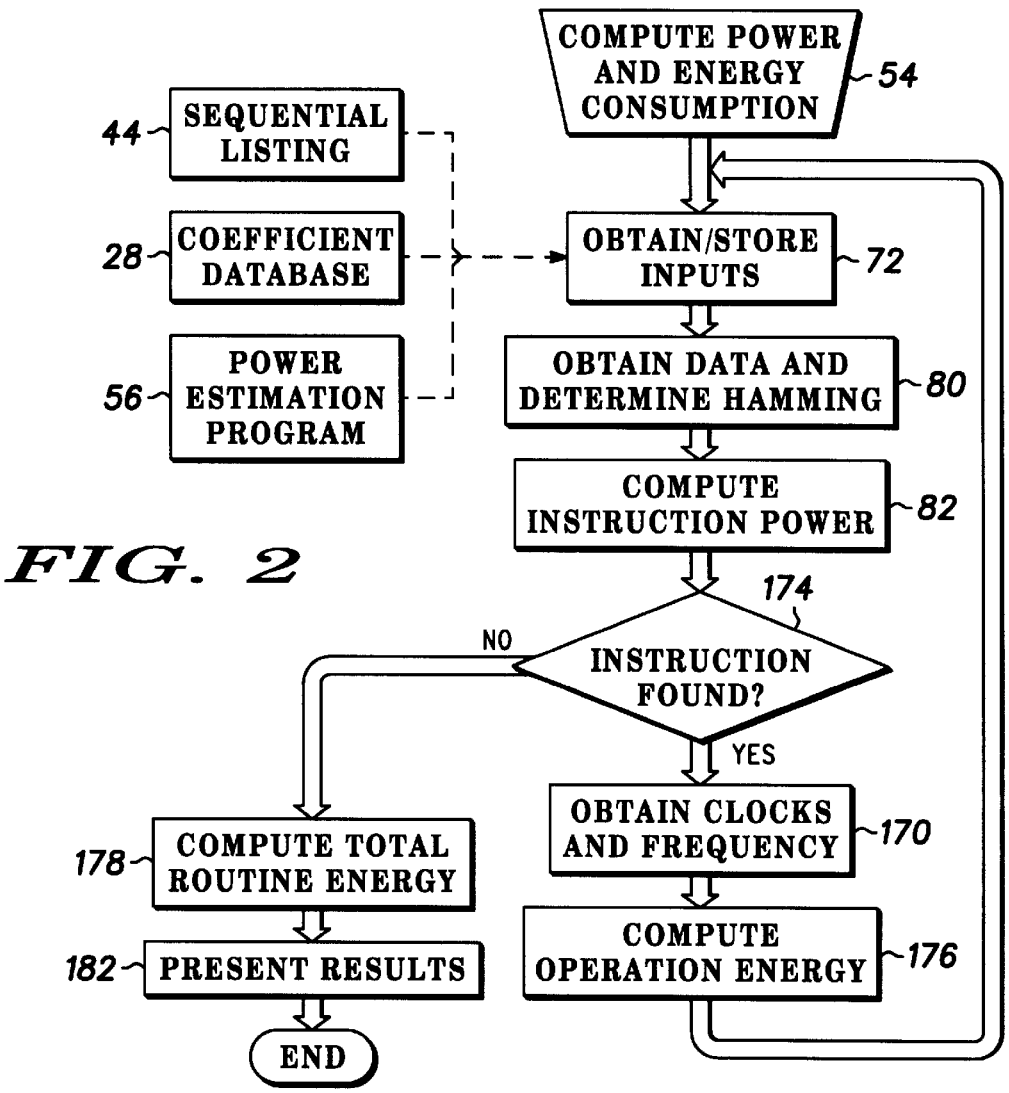
FIG. 2 depicts a flowchart of a process for estimating energy consumed by a processor while executing a test code routine in accordance with a preferred embodiment of the present invention.
FIG. 8 depicts a table of variable type codes versus variable values in accordance with a preferred embodiment of the present invention.
Figure 3:
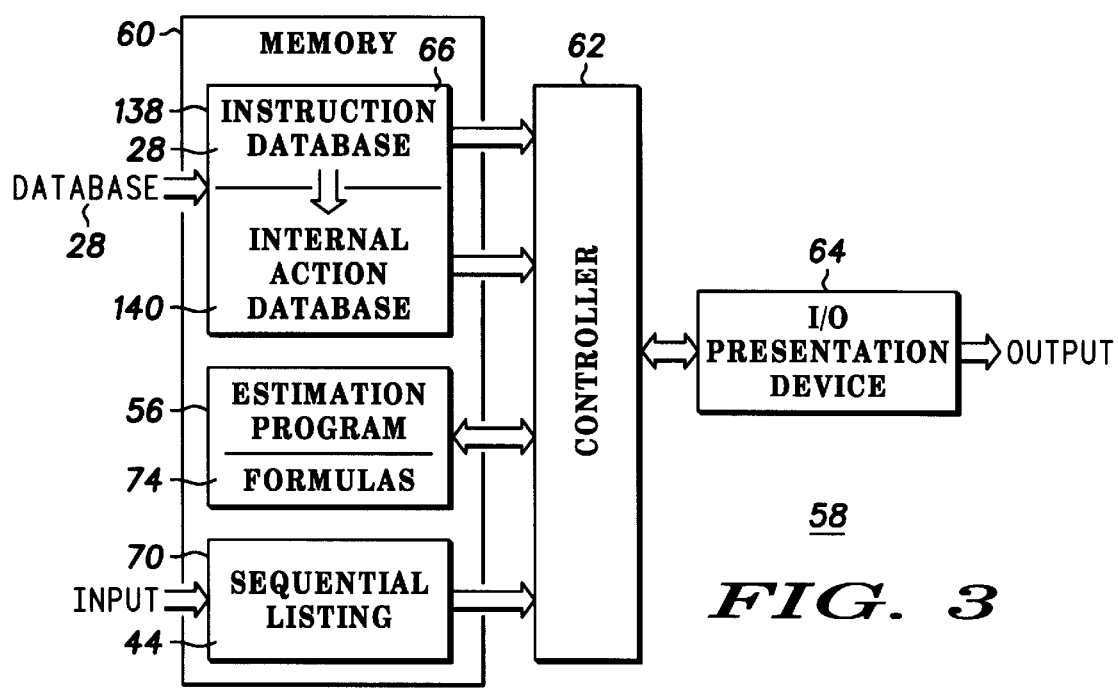
FIG. 3 depicts a block diagram of a power estimation computer system in accordance with a preferred embodiment of the present invention.

Following task 40, generation process 20 performs a process 54 for estimating energy consumed by processor 22. The inputs to process 54 include sequential listing 44 of operating instructions 38 (including input test data 46 and output test data 48) created in task 40, database 28 selected in task 24, and a processor power consumption estimation application program 56. FIG. 2 depicts a flowchart of process 54 in accordance with a preferred embodiment of the present invention. Application program 56 is executed on a power estimation computer system 58, a block diagram of which is shown in FIG. 3.

FIGS. 4A and 4B depicts tables of power and energy estimation formulas and associated results and coefficients in accordance with a preferred embodiment of the present invention. The outputs of process 54 are the results of computation using the formulas in FIG. 4A. The following discussion refers to FIGS. 2 and 3, with references to FIGS. 1, 4A and 4B as required.

Computer system 58 contains a memory 60 coupled to a controller 62. Controller 62 also couples to an information presentation device 64. Memory 60 is divided into in three areas into which data are placed: a database memory 66, a program memory 68, and a sequential listing or instruction memory 70. The results obtained by computer system 58 after execution of process 54 are sent to information presentation device 64 which, in the preferred embodiment, is a video display terminal and/or printer.

Process 54 (FIG. 2) executes a task 72 wherein the inputs to process 54 are obtained and stored into memory 60. In the preferred embodiment, sequential listing 44 is stored in instruction memory 70, database 28 is stored into database memory 66, and power estimation program 56 is stored into program memory 68.

Through the execution of task 72, process 54 places computer system 58 in a condition where it is able to fulfill its function. Process 54, through computer system 58, estimates average operation power 74 (FIGS. 4A and 4B) and operation energy 76 (FIG. 4B) for each operating instruction 38, as well as total routine energy 78 (FIG. 4A). Average operation power 74 is the average power consumption (energy consumed per unit of time) of processor 22 for a given operating instruction 38. Operation energy 76 is the total energy consumed by processor 22 for a given operating instruction 38. Total routine energy 78 is the total energy consumed by processor 22 for all operating instructions 38 contained in sequential listing 44.

Following task 72, a task 80 of process 54 identifies and obtains one operating instruction 38, along with its associated input test data 46 and output test data 48, from sequential listing 44. In addition, task 80 then analyses input test data 46 and output test data 48 to determine and define an input hamming distance based upon input test data 46 and an output hamming distance based upon output test data 48.

Those skilled in the art will recognize that the input hamming distance is equivalent to the number of bit transitions occurring at inputs to the selected processor 22 (FIG. 1) when executing operating instruction 38 with input test data 46. Likewise, the output hamming distance is equivalent to the number of bit transitions occurring at outputs of processor 22 when executing operating instruction 38 with output test data 48. Accordingly, task 80 evaluates input test data 46 and output test data 48 for this and a previous operating instruction 38 in order to determine the input and output hamming distances.

Figure 5:
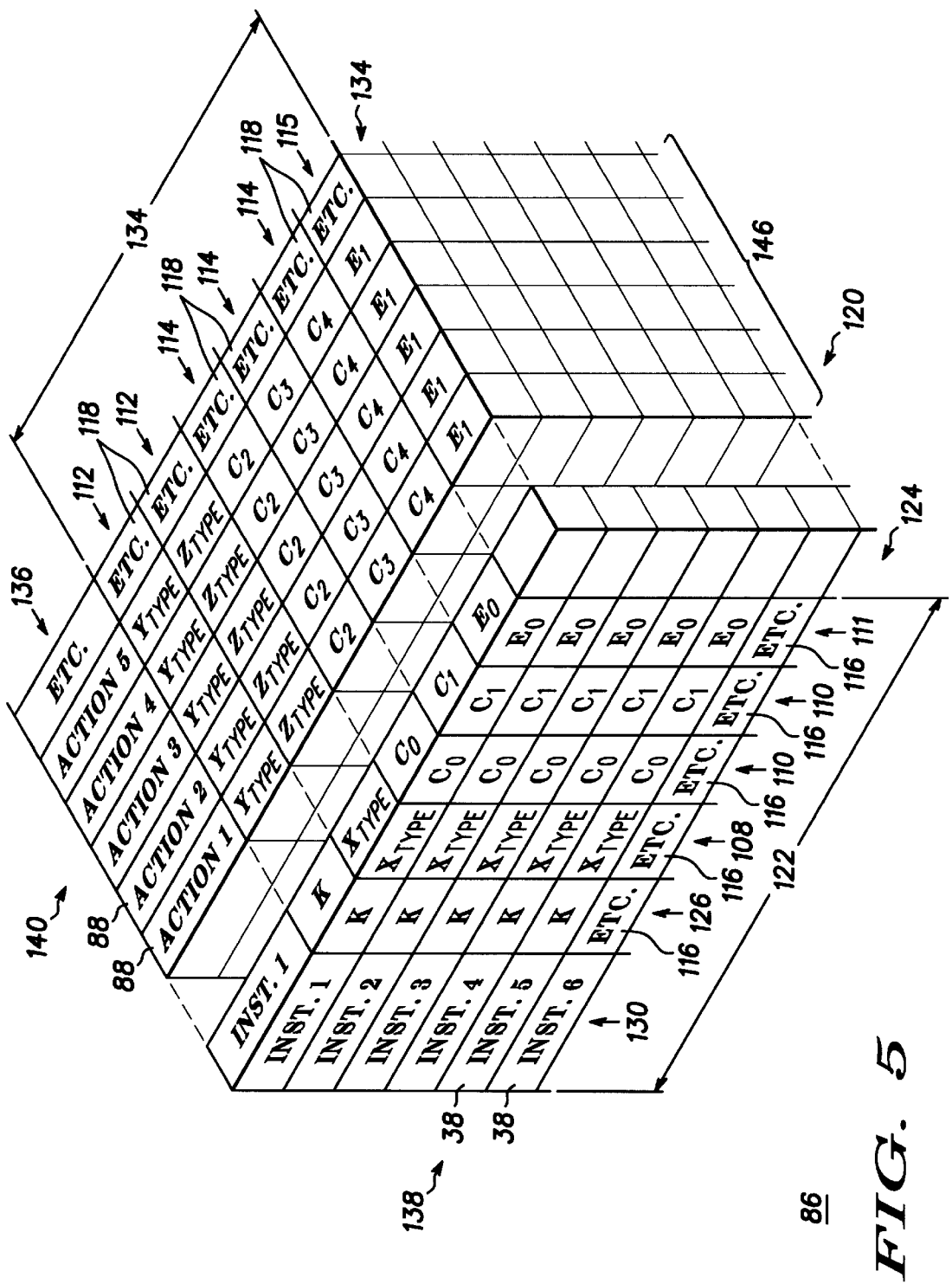
FIG. 5 depicts a first embodiment of a data structure residing in a memory of the power estimation computer system in accordance with a preferred embodiment of the present invention.
Figure 6:
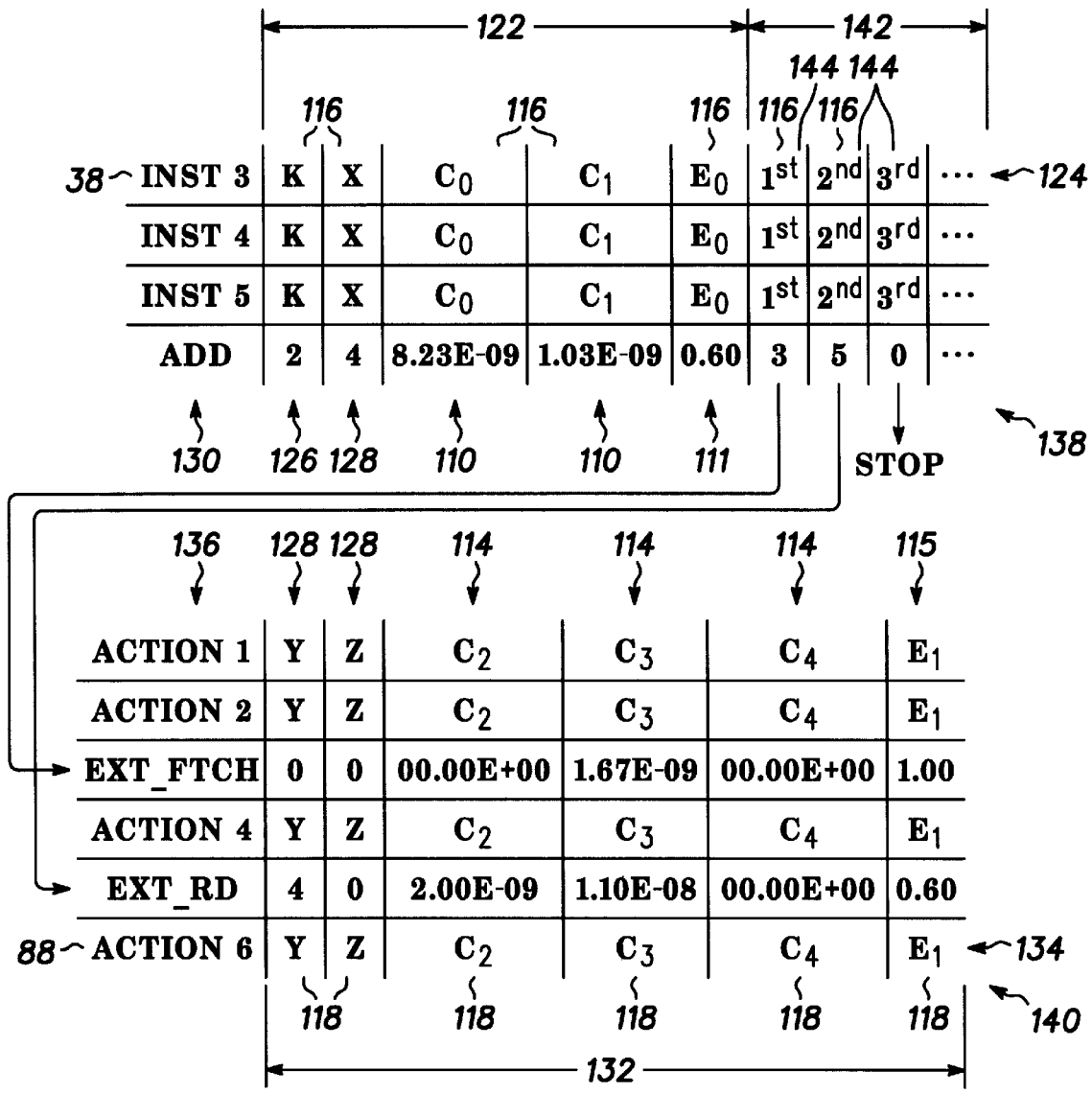
FIG. 6 depicts a second embodiment of the data structure residing in the memory of the power estimation computer system in accordance with a preferred embodiment of the present invention.

Process 54 then executes a process 82. Process 82 obtains an operation formula 84 (FIG. 4A) and computes average operation power ($P_O$) 74 (FIG. 4A). Average operation power 74 is the average power consumed by processor 22 in the execution of operating instruction 38. FIG. 5 depicts a first embodiment of a data structure 86 residing in memory 60 of power estimation computer system 58, and FIG. 6 depicts a second embodiment of data structure 86 residing in memory 60 of power estimation computer system 58, in accordance with a preferred embodiment of the present invention. The following discussion refers to FIGS. 2 and 3, with reference to FIGS. 1, 4A, 4B, 5, and 6 as required.

Most operating instructions 38 cause processor 22 to perform one or more internal actions 88 (FIGS. 5 and 6). For example, the operating instruction "ADD x:(r1),a" causes processor 22 to perform two internal actions 88, an external fetch, "Ext_ftch", and an external read, "Ext_rd".

Operation formula 84 (FIGS. 4A and 4B) shows that average operation power 74 is the sum of two powers, instruction power ($P_I$) 90 and summed-action power ($P_S$) 92, which constitute the terms of operation formula 84. Instruction power 90 is the average power consumed by processor 22 while executing operating instruction 38 without regard to any internal actions 88 performed. That is, instruction power 90 is the average static power consumed while executing operating instruction 38. Instruction power 90 is described by an instruction formula 94.

Summed-action power 92 is the sum of all action powers ($P_A$) 96 performed by processor 22 while executing operating instruction 38. Multiple action powers 96 constitute the terms of a summed-action formula 98, which describes summed-action power 92.

A given action power 96 is the average power to be attributed to a given internal action 88 while executing operating instruction 38. That is, action power 96 is the average dynamic power consumed while executing an internal action 88. If a given operating instruction 38 requires a specific number of internal actions 88, then summed-action formula 98 will have that number of terms, each of which represents a specific action power 96. Each action power 96 for each operating instruction 38 is described by its own action formula 100.

As is known to those skilled in the art, the mathematical laws of substitution allow a term in one formula to be substituted by another formula describing that term. Therefore, each term representing action power 96 in summed-action formula 98 may be substituted by a corresponding action formula 100 to produce an expanded summed-action formula. Similarly, the term representing instruction power 90 and the term representing summed-action power 92 in operation formula 84 may be substituted by a corresponding instruction formula 94 and summed-action formula 98 (already expanded) to produce an expanded operation formula.

In the preferred embodiment, instruction formula 94 is depicted mathematically as shown in FIG. 4A. Within instruction formula 94 are the following terms: instruction power ($P_I$) 90 in watts; a processor clock frequency ($f_C$) 106 in hertz; an instruction variable (X) 108; instruction constants ($C_0$ and $C_1$) 110; and an instruction exponent ($E_0$) 111.

Similarly, action formula 100 is depicted mathematically as shown in FIG. 4A. Within action formula 100 are the following terms: action power ($P_A$) 96 in watts; processor clock frequency ($f_C$) 106 in hertz; action variables (Y and Z) 112; action constants ($C_2$, $C_3$, and $C_4$) 114; and an action exponent ($E_1$) 115.

Instruction variables 108, constants 110, and exponents 111 in formula 94 constitute instruction coefficients 116. Similarly, action variables 112, constants 114, and exponent 115 in formula 100 constitute action coefficients 118. Coefficients 116 and 118 are either contained in database 28 (FIGS. 5 and 6) or derived from data contained in database 28, input test data 46, and output test data 48.

Instruction coefficients 116 and action coefficients 118 are derived empirically. Each processor 22 has a corresponding database 28 containing coefficients 116 and 118 peculiar to operating instructions 38 for that processor 22. During the creation of each database 28, the corresponding processor 22 is physically tested to determine the power and energy consumed for each operating instruction 38 and each internal action 88 required of each operating instruction 38. The resultant data derived from this testing is correlated by a curve-fitting computer to establish power curves for each operating instruction 38 and each internal action 88 associated therewith. Coefficients 116 and 118 are then derived by fitting the power curves to formulas 94 and 100. The derived coefficients 116 and 118 are then placed in database 28.

Database 28 is stored in memory 60 as data structure 86. Data structure 86 is configured in such a manner as to allow controller 62 to access memory 60 and the data contained therein.

In FIG. 5, a first preferred embodiment of data structure 86 is depicted in the form of a three-dimensional data array 120. Data array 120 contains an instruction coefficient list 122. Instruction coefficient list 122 contains instruction coefficients 116 for substantially all operating instructions 38 for processor 22. Each "item" in instruction coefficients list 122 is an instruction coefficient set 124 for a specific operating instruction 38. In the preferred embodiment, instruction coefficient set 124 contains a number of clock cycles (K) 126, an instruction variable type code ($X_{Type}$) 128, instruction constants ($C_0$, and $C_1$) 110, and instruction exponent ($E_0$) 111.

Additionally, instruction coefficient list 122 may contain an associated instruction list 130. Instruction list 130 may be used as a pointer to an appropriate instruction coefficient set 124. Those skilled in the art, however, will appreciate that instruction list 130 is not required for proper operation. Position alone may be used to associate a given operating instruction 38 with its instruction coefficient set 124.

Associated with each instruction coefficient set 124 for each operating instruction 38 is an action coefficient list 132. Action coefficient list 132 contains action coefficients 118 for all possible internal actions 88 for the specific operating instruction 38 with which it is associated. Each "item" in action coefficients list 132 is an action coefficient set 134 for a specific internal action 88. In the preferred embodiment, action coefficient set 134 contains action variable type codes ($Y_{Type}$ and $Z_{Type}$) 128, action constants ($C_2$, $C_3$, and $C_4$) 114, and action exponent ($E_1$) 115.

Additionally, action coefficient list 132 may contain an associated action list 136. Action list 136 may be used as a pointer to an appropriate action coefficient set 134. Those skilled in the art, however, will appreciate that action list 136 is not required for proper operation. Position alone may be used to associate a given internal action 88 with its action coefficient set 134.

Within data structure 86, instruction coefficient list 122, with or without instruction list 130, constitutes an instruction database 138. Each instruction coefficient 116 in instruction database 138 is keyed or linked to a specific operating instruction 38 exclusive of any internal action 88 performed by processor 22 in response to that specific operating instruction 38.

Similarly, action coefficient list 146, with or without action list 136, constitutes an action database 140. Each action coefficient 118 in action database 140 is keyed or linked to a specific internal action 88, which is in turn is keyed or linked to a specific operating instruction 38.

Instruction database 138 and action database 140 are functional divisions of database 28. Database 28 is therefore a composite database.

In FIG. 6, data structure 86 is depicted in a second preferred embodiment as two two-dimensional data arrays: instruction database 138 and action database 140. Instruction database 138 is similar to that already discussed in FIG. 5, save that instruction coefficient set 124 contains additional instruction coefficients 116 in the form of a pointer list 142. Pointer list 142 contains a pointer set 144. Each pointer 146 in pointer set 144 points to a subsequent internal action 88 performed by processor 22 when executing operating instruction 38. Action coefficient sets 134 for all possible internal actions 88 are contained in action database 140. By using this pointer scheme, action database 140 need now contain action coefficient set 134 for a given internal action 88 once, rather than once for each operating instruction 38 using that internal action 88. For example, the operating instruction "ADD x:(r1),a" in exemplary instruction database 138 points to the third and fifth internal actions 88 in exemplary action database 140. The first and third internal actions 88 are an external fetch, "Ext_ftch", and an external read, "Ext_rd", respectively.

Figure 7:
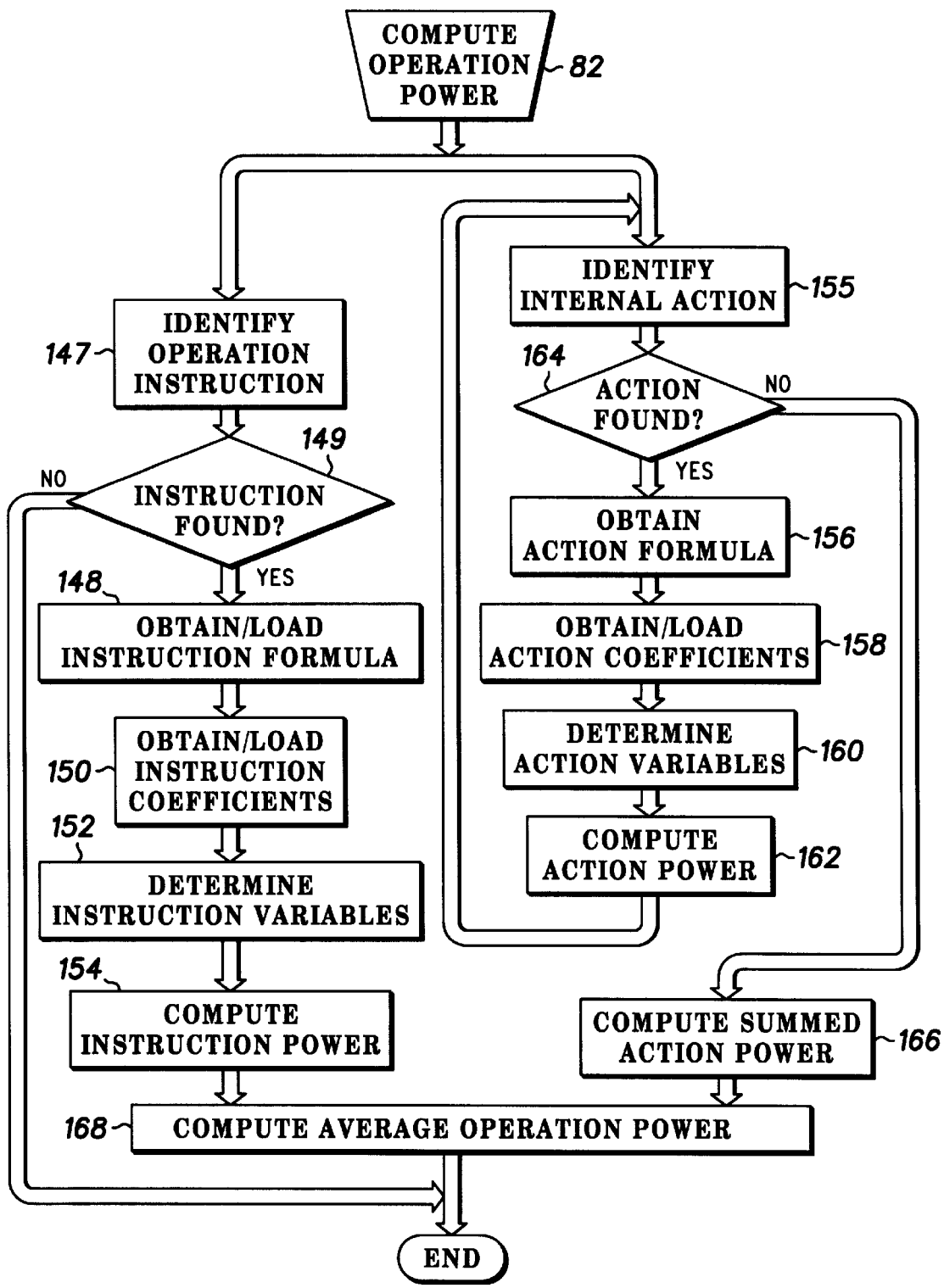
FIG. 7 depicts a flowchart of a process for computing power consumed by a processor while executing an operating instruction in accordance with a preferred embodiment of the present invention.

FIG. 7 depicts a flowchart of a process 82 for computing average operation power 74 consumed by processor 22 while executing operating instruction 38 in accordance with a preferred embodiment of the present invention. The following discussion refers to FIGS. 2 and 7.

Following task 80, in the preferred embodiment, process 54 performs process 82. Process 82 executes a task 147 to identify a first or next operating instruction 38 in sequential listing 44 (FIG. 1).

A decision task 149 then determines if task 147 found operating instruction 38. If decision task 149 determines that operating instruction 38 was not found, i.e. all operating instructions 38 in sequential listing 44 have been processed, then process 82 is terminated and control is returned to process 54 (FIG. 2).

If decision task 149 has determined that operating instruction 38 has been found, then a task 148 obtains instruction formula 94 (FIG. 4) from within power estimation program 56 (FIG. 2).

A task 150 then obtains instruction coefficients 116 (FIGS. 5 and 6), extracting them from instruction database 138. Task 150 then loads instruction coefficients 116 into instruction formula 94 (FIG. 4A).

A task 152 then determines the value of instruction variable 108 (FIG. 4B). Variable type code 128 (FIGS. 5 and 6), extracted from instruction database 138 in task 148, together with input test data 46 and output test data 48 from sequential listing 44 (FIGS. 1 and 2), determines the value of instruction variable 108. FIG. 8 depicts a table of variable type codes 128 versus values for instruction variable 108 in accordance with a preferred embodiment of the present invention.

In the exemplary operating instruction 38 "ADD x:(r1),a" (FIG. 6), variable type code 128 is 4, thus instruction variable X 108 is the sum of the input and output hamming distances, as determined in task 80 (FIG. 2).

A task 154 of process 82 then computes instruction power 90 (FIG. 4B) through the use instruction formula 94 (FIG. 4A). The value of instruction power 90 becomes a term in operation formula 84 (FIGS. 4A and 4B) and constitutes an instruction portion of average operation power 74 (FIG. 4B).

Also following task 80, process 82 executes a task 155 to identify a first or next internal action 88 (FIGS. 5 and 6) associated with operating instruction 38 (FIG. 1).

A decision task 164 then determines if task 155 found internal action 88. If decision task 164 determines that internal action 88 was not found, i.e. all internal actions 88 associated with operating instruction 38 have been processed, then decision task 164 directs control to a task 166 (to be discussed later).

If decision task 164 has determined that internal action 88 has been found, then a task 156 obtains action formula 100 (FIG. 4A) from within power estimation program 56 (FIG. 2).

A task 158 then obtains action coefficients 118 (FIG. 6), by extracting them from action database 140. Task 158 then loads action coefficients 118 into action formula 100.

A task 160 then determines the value of action variables 112. Variable type code 128, together with input test data 46 and output test data 48 from sequential listing 44 (FIGS. 1 and 2), determines the values of action variables 112.

For the exemplary operating instruction 38 "ADD x:(r1), a" (FIG. 6), a first internal action 88 has both a $Y_{Type}$ and a $Z_{Type}$ variable type code 128 of 0, thus the values of action variables Y and Z 112 are 1, as indicated in the table shown in FIG. 8.

A task 162 of process 82 then computes action power 96 through the use of action formula 100 (FIGS. 4A and 4B). The value of action power 96 becomes a term in summed-action formula 98 and constitutes an action portion of average operational power 74.

Following task 162, control is returned to task 155 above, where an attempt is made to identify another internal action 88. If another internal action is found, then decision task 164 causes tasks 156, 158, 160, and 162 to be repeated for that internal action 88. Decision task 164 continues to repeat tasks 156, 158, 160, and 162 until action power 96 for all internal actions 88 associated with operating instruction 38 have been computed and their values have become terms in summed-action formula 98 and constitute action portions of average operational power 74.

A task 166 then computes summed-action power 92 utilizing summed action formula 98. All action powers 96 for all internal actions 88 associated with operating instruction 38 are summed to produce summed-action power 92. The value of summed-action power 92 becomes a term in operation formula 84 and constitutes a summed-action portion of average operation power 74.

A last task 168 in process 82 is performed upon the completion of tasks 154 and 166. Task 168 computes average operation power 74 utilizing operation formula 84. The two terms of operation formula 84, instruction power 90 and summed-action power 92, are summed to produce average operation power 74.

After task 168, process 82 is complete, and control is returned to process 54 (FIG. 2). The following discussion refers to FIGS. 1 and 2.

A decision task 174 of process 54 is performed following process 82 to determine if decision task 149 (FIG. 7) of process 82 found operating instruction 38.

If operating instruction 38 was found, a task 170 of process 54 obtains number of clock cycles 126 for operating instruction 38 and clock frequency 106 of processor 22.

A task 176 then computes, through the use of an operation energy formula 172, operation energy 76 consumed by processor 22 for operating instruction 38. Operation energy 76 is determined by multiplying average operation power 74, computed in process 82, by number of clock cycles 126 and the reciprocal of clock frequency 106.

Following task 176, control returns to task 72. Decision task 174 causes tasks 170, 176, 72, 80, and process 82 to be repeated for each operating instruction 38 in sequential listing 44.

When decision task 174 has determined that operation energy 76 has been computed for all operating instructions 38 in sequential listing 44, process 54 executes a task 178 to compute total routine energy 78 consumed by processor 22 in the execution of code routine 36 (FIG. 1). Total routine energy 78 is determined through the use of a routine energy formula 180, and is the sum of each operation energy 76 for each operating instruction 38 in sequential listing 44.

Referring to FIGS. 4A and 4B, the results of process 54 are:

a) average operation power 74 consumed by processor 22 in the execution of each operating instruction 38 in sequential listing 44, as determined by process 82;

b) operation energy 76 consumed by processor 22 in the execution of each operating instruction 38 in sequential listing 44, as determined by task 176; and c) total routine energy 78 consumed by processor 22 in the execution of all operating instructions 38 in sequential listing 44, hence in code routine 36 (FIG. 1), as determined by task 178.

In a task 182, process 54 passes its results to information presentation device 64 (FIG. 3). In the preferred embodiment, information presentation device 64 is a video display terminal and/or printer, the output of which is controlled by the results of process 54.

After task 182, control is returned to process 20 (FIG. 1). The following discussion refers to FIG. 1.

Following process 54, a decision task 184 of process 20 determines if the results of process 54 are acceptable. If they are, then process 20 terminates and power-optimized code for processor 22 has successfully been created.

If decision task 184 determines that the results of process 54 are not acceptable, then a decision task 186 determines if the selection of processor 22 is acceptable. If it is, then control returns to task 32.

If decision task 186 determines that the selection of processor 22 was not acceptable, then control returns to task 24. Tasks 24, 32, and 40, process 54, and tasks 184 and 186 are repeated as required until task 184 determines that the results of process 54 are acceptable.

In summary, the present invention provides a methodology wherein code routine 36 for processor 22 may be optimized for power and energy consumption, both on a code-by-code basis (average operation power 74 and operation energy 76) and on a whole routine basis (total routine energy 78). This allows the designer and programmer, working in concert, to minimize energy consumption in the device under development, thus extending battery life.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for estimating power consumed by a processor when performing a sequence of operating instructions, said method comprising the steps of:

identifying an operating instruction from said sequence of operating instructions, said operating instruction being associated with one or more actions performed internally by said processor in response to said operating instruction;

obtaining an instruction power formula which describes an average static power consumed by said processor while executing said operating instruction;

obtaining instruction coefficients for said operating instruction from a database, said database comprising instruction and action coefficients for said processor;

obtaining an action power formula for each of said one or more actions, each action power formula describing a dynamic power consumed by said processor while executing a corresponding action of said one or more actions;

obtaining action coefficients corresponding with said operating instruction for each action of said one or more actions; and computing a total power for said operating instruction by adding an instruction power to a total action power, wherein:

said instruction power is computed with said instruction power formula and said instruction coefficients, and wherein:

said total action power is computed by summing action powers computed with each said action power formula corresponding with each action of said one or more actions and said action coefficients corresponding with each action of said one or more actions.

2. A method as claimed in claim 1 additionally comprising the steps of:

providing a code routine, said code routine being a series of assembly-language instructions for said processor, simulating an execution of said code routine with a processor simulator for said processor, the simulating step providing said sequence of operating instructions;

repeating said identifying, obtaining, and computing steps for another operating instruction of said sequence of operating instructions for said processor; and computing a total routine energy for said code routine based on said total power computed for each operating instruction of said sequence, a clock frequency and a number of clock cycles.

3. A method as claimed in claim 2 wherein: said code routine instructs said processor for operation within a battery-powered device; and wherein the simulating step includes the step of simulating said code route including test data representative of conditions within said battery-powered device.

4. A method as claimed in claim 3 additionally comprising the step of presenting said total routine energy on an information presentation device.

5. A method as claimed in claim 4 wherein said database is a first database, and said processor is a first processor, and wherein the method additionally comprising the steps of:

selecting said first processor from a plurality of different processors;

selecting said first database from a library of databases, said first database comprising said instruction and action coefficients corresponding with said first processor;

selecting a second processor from said plurality of different processors;

selection a second database from said library, said second database comprising instruction and action coefficients for said second processor;

repeating, for said second processor, the steps of providing, simulating, repeating, identifying, obtaining instruction coefficients, obtaining action coefficients, and computing using said second database to obtain a second total routine energy for said second processor; and selecting one of said processors for use in said battery-powered device based on said total routine energy for said one processor.

6. A method as claimed in claim 2 wherein said instruction power formula with said instruction coefficients for said operating instruction represent an average power consumed by said processor while executing said operating instruction without regard to said actions performed internally by said processor.

7. A method as claimed in claim 2 wherein said database contains instruction coefficients and action coefficients for said processor, said instruction and action coefficients for use, respectively, in said instruction power and action power formulas, and wherein the method further comprises the steps of:

deriving said instruction coefficients by testing said processor to determine an instruction power consumed by said processor for said operating instruction;

curve fitting said instruction power consumed to said instruction power formula;

deriving said action coefficients by testing said processor to determine an action power consumed by said processor for each action of said one or more actions associated with said operating instruction;

curve fitting said action power consumed to said action power formula; and storing said instruction and action coefficients in said database.

8. A method as claimed in claim 7 additionally comprising the steps of:

determining an input hamming distance and an output hamming distance for each operating instruction of said sequence provided by the simulating step, the input hamming distance being equivalent to a number of bit transitions occurring at inputs of said processor, the output hamming distance being equivalent to a number of bit transitions occurring at outputs of said processor; and deriving at least some of either said action or instruction coefficients using said input and output distances.

9. A method as claimed in claim 8 wherein the simulating step further provides input and output test data for said processor, and wherein the step of determining said input and output hamming distances, includes the step of determining said input and output hamming distances using said input and output test data.

10. A method as claimed in claim 7 further comprising the steps of:

repeating the deriving said instruction coefficients step for other operating instructions for said processor;

repeating the deriving said action coefficients step for each action corresponding with each of said other operating instructions for said processor;

repeating the curve fitting steps for each of said other operating instructions and corresponding actions; and repeating the storing step for each of said other operating instruction and corresponding actions, said instruction coefficients and said corresponding action coefficients for said other operating instructions comprising said database.

11. A system for estimating power consumed by a processor, said system comprising:

a controller configured to identify an operating instruction from a sequence of operating instructions, said operating instruction being associated with one or more actions performed internally by said processor in response to said operating instruction, obtain an instruction power formula describing an average static power consumed by said processor for said operating instruction, and obtain an action power formula for each of said one or more actions, each action power formula describing a dynamic power consumed by said processor while executing a corresponding action of said one or more actions;

a memory comprising a database coupled with said controller, said database comprising instruction and action coefficients for said processor, said instruction coefficients being associated with said operating instruction, said action coefficients corresponding with each action of said one or more actions associated with said operating instruction; and an information presentation device coupled to said controller for presenting estimated power, wherein said controller obtains said instruction coefficients and said action coefficients from said database, and computes a total power for said operating instruction by adding an instruction power to a total action power, said instruction power being computed with said instruction power formula using said instruction coefficients, said total action power being computed by summing action powers computed with each said action power formula corresponding with each action of said one or more actions and said action coefficients corresponding with each action of said one or more actions.

12. A system as claimed in claim 11 wherein the memory further comprises a portion for storing said sequence of operating instructions, said portion having an input for coupling with a processor simulator for simulating said processor and providing said sequence of operating instructions based on a code routine, said code routine being a series of assembly-language instructions for said processor, and wherein the controller computes a total routine energy for said code routine based on said total power computed for each operating instruction of said sequence, a clock frequency and a number of clock cycles.

13. A system as claimed in claim 11 wherein said instruction power formula with said instruction coefficients for said operating instruction represent an average power consumed by said processor while executing said operating instruction without regard to said actions performed internally by said processor.

14. A system as claimed in claim 13 wherein said controller is additionally configured to:

determine an input hamming distance and an output hamming distance for each operating instruction of said sequence provided by the processor simulator, the input hamming distance being equivalent to a number of bit transitions occurring at inputs of said processor, the output hamming distance being equivalent to a number of bit transitions occurring at outputs of said processor; and derive at least some of either said action or instruction coefficients using said input and output distances, and wherein the memory further comprises a portion for storing input and output test data for said processor provided by said processor simulator, and wherein the controller is further configured to determine said input and output hamming distances using said input and output test data.

* * * * *